United States Patent
Adzic et al.

(10) Patent No.: US 9,017,530 B2
(45) Date of Patent: Apr. 28, 2015

(54) METHOD AND ELECTROCHEMICAL CELL FOR SYNTHESIS AND TREATMENT OF METAL MONOLAYER ELECTROCATALYSTS METAL, CARBON, AND OXIDE NANOPARTICLES ION BATCH, OR IN CONTINUOUS FASHION

(75) Inventors: Radoslav Adzic, East Setauket, NY (US); Junliang Zhang, Shanghai (CN); Kotaro Sasaki, Ronkonkoma, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 535 days.

(21) Appl. No.: 13/427,309

(22) Filed: Mar. 22, 2012

(65) Prior Publication Data

US 2012/0245017 A1  Sep. 27, 2012

Related U.S. Application Data (60) Provisional application No. 61/466,842, filed on Mar. 23, 2011.

(51) Int. Cl.
*C25D 17/02* (2006.01)
*C25D 7/00* (2006.01)
(Continued)

(52) U.S. Cl.
CPC ...... *C25D 7/006* (2013.01); *C25D 5/20* (2013.01); *C25D 17/002* (2013.01);
(Continued)

(58) Field of Classification Search
CPC .............................. C25D 7/006; C25D 17/002
USPC ................................................ 205/145, 148
See application file for complete search history.

(56) References Cited

U.S. PATENT DOCUMENTS

| | | |
|---|---|---|
| 6,670,301 B2 | 12/2003 | Adzic et al. |
| 7,507,495 B2 | 3/2009 | Wang et al. |

(Continued)

FOREIGN PATENT DOCUMENTS

WO  2011119818  9/2011

OTHER PUBLICATIONS

Adzic, R., "Recent Advances in the Kinetics of Oxygen Reduction," in Electrocatalysis, Ed. J. Lipowski and P.N. Ross, New York, John Wiley & Sons, 1998.

(Continued)

*Primary Examiner* — James Lin
*Assistant Examiner* — Ho-Sung Chung
(74) *Attorney, Agent, or Firm* — Dorene M. Price; Lars O. Husebo (57) ABSTRACT

An apparatus and method for synthesis and treatment of electrocatalyst particles in batch or continuous fashion is provided. In one embodiment, the apparatus comprises a sonication bath and a two-compartment chamber submerged in the sonication bath. The upper and lower compartments are separated by a microporous material surface. The upper compartment comprises a cover and a working electrode (WE) connected to a Pt foil contact, with the foil contact connected to the microporous material. The upper chamber further comprises reference counter electrodes. The lower compartment comprises an electrochemical cell containing a solution of metal ions. In one embodiment, the method for synthesis of electrocatalysts comprises introducing a plurality of particles into the apparatus and applying sonication and an electrical potential to the microporous material connected to the WE. After the non-noble metal ions are deposited onto the particles, the non-noble metal ions are displaced by noble-metal ions by galvanic displacement.

18 Claims, 4 Drawing Sheets

(51) Int. Cl.
*C25D 5/20* (2006.01)
*C25D 17/00* (2006.01)
*B82Y 30/00* (2011.01)
*H01M 4/88* (2006.01)

(52) U.S. Cl.
CPC .............. *C25D 17/005* (2013.01); *B82Y 30/00* (2013.01); *H01M 4/8853* (2013.01); *Y02E 60/50* (2013.01); *C25D 17/007* (2013.01)

(56) References Cited

U.S. PATENT DOCUMENTS

| | | | |
|---|---|---|---|
| 2005/0211569 A1* | 9/2005 | Botte et al. | 205/687 |
| 2005/0269266 A1* | 12/2005 | Twardowski et al. | 210/640 |
| 2006/0135359 A1 | 6/2006 | Adzic et al. | |
| 2007/0264189 A1 | 11/2007 | Adzic et al. | |
| 2009/0145772 A1* | 6/2009 | Zhang et al. | 205/687 |
| 2010/0177462 A1 | 7/2010 | Adzic et al. | |
| 2010/0216632 A1 | 8/2010 | Adzic et al. | |

OTHER PUBLICATIONS

Brankovic, S, et al., "Metal Monolayer Deposition by Replacement of Metal Adlayers on Electrode Surfaces," Surface Science, vol. 474, pp. L173-L179, 2001.

Adzic, R., et al., "Platinum Monolayer Fuel Cell Electrocatalysts," Topics in Catalysis, vol. 46 pp. 249-262, 2007.

* cited by examiner

METHOD AND ELECTROCHEMICAL CELL FOR SYNTHESIS AND TREATMENT OF METAL MONOLAYER ELECTROCATALYSTS METAL, CARBON, AND OXIDE NANOPARTICLES ION BATCH, OR IN CONTINUOUS FASHION

This application claims the benefit under 35 U.S.C. 119(e) of U.S. Provisional Application No. 61/466,842 filed on Mar. 23, 2011, the content of which is incorporated herein in its entirety.

STATEMENT OF GOVERNMENT LICENSE RIGHTS

This invention was made with Government support under contract number DE-AC02-98CH10886, awarded by the U.S. Department of Energy. The Government has certain rights in the invention.

BACKGROUND

I. Field of the Invention

This invention relates generally to an apparatus and method for controllable synthesis of noble metal monolayer electrocatalysts involving the redox displacement of an adlayer of a non-noble metal, such as Cu, by a noble-metal, such as Pt.

II. Background of the Related Art

Metals such as platinum (Pt), palladium (Pd), ruthenium (Ru), and related alloys are known to be excellent catalysts. When incorporated in electrodes of an electrochemical device such as a fuel cell, these materials function as electrocatalysts since they accelerate electrochemical reactions at electrode surfaces yet are not themselves consumed by the overall reaction. Although noble metals have been shown to be some of the best electrocatalysts, their successful implementation in commercially available energy conversion devices is hindered by their high cost in combination with other factors such as a susceptibility to carbon monoxide (CO) poisoning, poor stability under cyclic loading, and the relatively slow kinetics of the oxygen reduction reaction (ORR).

A variety of approaches has been employed in attempting to address these issues. One approach involves increasing the overall surface area available for reaction by forming particles with nanometer-scale dimensions. Loading of more expensive noble metals such as Pt has been further reduced by forming nanoparticles from alloys comprised of Pt and a low-cost component. Still further improvements have been attained by forming core-shell nanoparticles in which a core particle is coated with a thin shell of a different material which functions as the electrocatalyst. The core is usually a low cost material which is easily fabricated whereas the shell comprises a more catalytically active noble metal. An example is provided by U.S. Pat. No. 6,670,301 to Adzic, et al. which discloses a process for depositing a thin film of Pt on dispersed Ru nanoparticles supported by carbon (C) substrates. Another example is U.S. Patent Appl. Publ. No. 2006/0135359 to Adzic, et al. which discloses platinum- and platinum-alloy coated palladium and palladium alloy nanoparticles. Each of the aforementioned is incorporated by reference in its entirety as if fully set forth in this specification. Although these approaches have produced catalysts with a higher catalytic activity and reduced noble metal loading, realization of these enhancements on a commercial scale requires the development of large-scale and cost-effective manufacturing capabilities.

Practical synthesis of electrocatalyst particles with peak activity levels requires the development of commercially viable processes which are still capable of providing atomic-level control over the formation of ultrathin surface layers. Such a process must allow formation of uniform and conformal atomic-layer coatings of the desired material on a large number of three-dimensional particles having sizes as small as a few nanometers. One method of depositing a monolayer of Pt on particles of different metals involves the initial deposition of an atomic monolayer of a metal such as copper (Cu) by underpotential deposition (UPD). This is followed by galvanic displacement of the underlying Cu atoms by a more noble metal such as Pt as disclosed, for example, in U.S. Patent Application Publ. No. 2007/0264189 to Adzic, et al. Another method involves hydrogen adsorption-induced deposition of a monolayer of metal atoms on noble metal particles as described, for example, in U.S. Pat. No. 7,507,495 to Wang, et al. Yet another mechanism involves an apparatus and method for the synthesis and treatment of metal monolayer electrocatalyst particles in batch or continuous fashion, as described in PCT Patent Publication No. WO/2011/119818 to Adzic et al. Each of the aforementioned is incorporated by reference in its entirety as if fully set forth in this specification.

Although these processes have been successful for small-scale experiments performed in the laboratory, their commercial realization will require the development of systems and methods capable of processing a large number of electrocatalyst particles to within very tight tolerances. There, therefore, is a continuing need in the art for the development of commercially viable systems and methods for synthesizing electrocatalyst particles.

SUMMARY

Having recognized the above and other considerations, the inventors determined that there is a need to develop a simple and cost-effective apparatus and process for efficient, controllable synthesis, treatment and modification of low noble-metal content electro catalysts supported on nanoparticles. The method employs a specially designed cell that deposits an adlayer of a non-noble metal, such as Cu, onto nanoparticles and then displaces the non-noble metal with a monolayer of a noble-metal, such as Pt.

In one embodiment, the apparatus comprises a cell for synthesizing noble-metal monolayer or bilayer catalysts onto metal, alloy, core-shell, carbon, carbon-nanotube or carbon-nanohorn nanoparticles. The cell can take, depending on its size, 1 to 50 grams of nanoparticles in a single batch, or produce continuously a desired quantity of particles that serves as support for Pt or other noble metal monolayer or bilayer catalyst. The support nanoparticles, for example Pt or Pd alloys, are made at the cathode by applying a potential that facilitates the underpotential deposition (UPD) of monolayer of non-noble metals, such as Cu. After depositing a Cu monolayer, the particles lose connection to the cathode and the solution used for the UPD of Cu is replaced by one containing noble metal ions. Noble metal ions displace Cu atoms and get deposited as a monolayer on the nanoparticle. The apparatus can operate as a batch or as a continuous reactor.

In a preferred embodiment, the cell comprises a sonication bath and a chamber submerged in the sonication bath. The chamber has an upper compartment and a lower compartment separated by a microporous material surface. The upper compartment comprises a cover, which contains a working electrode (WE) electrically connected to a Pt foil contact, and the Pt foil contact is electrically connected to the microporous material. The upper compartment further comprises a reference electrode (RE), a counter electrode (CE), and contains a solution of metal ions. The lower compartment comprises an electrochemical cell containing a solution of metal ions. The cell can be adapted to maintain an atmosphere of an inert gas within the cell. An electric potential applied to the WE can be controlled by an external power supply. In a preferred embodiment the power supply is capable of applying a voltage in the range of −1 to +1 Volts.

In a particular embodiment, the microporous material is made of a carbon cloth, a reticulated glassy carbon, a microporous carbon material, or a Ti/Ru oxide fine gauze. As noted above, the microporous material is in contact with the WE through a Pt foil contact. When nanoparticles contact the microporous material, the nanoparticles obtain an electronic potential of the UPD of Cu.

In one embodiment, the method of synthesizing the nanoparticles comprises depositing a non-noble metal onto the surface of the electrocatalysts, removing the non-noble metal ions away from the nanoparticles, contacting the nanoparticles in a second solution containing noble-metal ions, and displacing the non-noble metal with a noble-metal ions. The method for depositing ultrathin films on a plurality of nanoparticles comprises: preparing an apparatus according to claim 1 with an electrolyte having a predetermined concentration of ions of a non-noble metal to be deposited as an adlayer; introducing the plurality of nanoparticles into the cell; applying sonication to the cell; applying a predetermined potential to the microporous material electrically connected to the working electrode for a predetermined duration; removing the nanoparticles from the lower compartment of the chamber; replacing the excess non-noble metal ions from the cell with an electrolyte having a predetermined concentration of ions of a noble metal; reintroducing the nanoparticles from (e) into the upper compartment of the chamber; applying sonication to the cell; and applying a predetermined potential to the microporous material electrically connected to the working electrode for a predetermined duration to deposit the noble metal ions by galvanic displacement, whereby the process of galvanic displacement results in deposition of the noble metal.

In a preferred embodiment, the non-noble metal ions are selected from the group consisting of Cu, Pb, Bi, Sn, Ce, Ag, Sb, Tl, and a combination thereof; and the more noble metal ions are produced from a salt of one or more of $PdCl_2$, $K_2PtCl_4$, $AuCl_3$, $IrCl_3$, $RuCl_3$, $OsCl_3$, or $ReCl_3$.

In a more preferred embodiment, the method comprises depositing Cu, from a $CuSO_4$ in a $H_2SO_4$ solution, onto a plurality of nanoparticles. After depositing the Cu, the nanoparticles are removed from the $Cu^{2+}$ ions and the nanoparticles are placed in a $K_2PtCl_4$ in $H_2SO_4$ solution in an Ar atmosphere. The Cu is then displaced by Pt which generates the electrocatalysts.

In yet another embodiment, film growth using the cell is performed in batch form. Using this approach, a single batch of nanoparticles is sequentially processed through each step of the deposition process. In still another embodiment, the cell is configured for continuous operation. This approach involves feeding a continuous supply of nanoparticles to the cell which, in turn, is operated continuously with sonication and a predetermined electrode potential.

The apparatus and method disclosed in this specification provide atomic-level control over film growth on a large number of particles, thereby making it suitable for commercial applications. It is especially advantageous in the production of electrocatalyst nanoparticles for use in energy conversion devices such as fuel cells, metal-air batteries, and supercapacitors.

DETAILED DESCRIPTION

These and other aspects of the invention will become more apparent from the following description and illustrative embodiments which are described in detail with reference to the accompanying drawings. In the interest of clarity, in describing the present invention, the following terms and acronyms are defined as provided below.

Acronyms:
MWNT: Multi-walled nanotube
NHE: Normal hydrogen electrode
ORR: Oxidation reduction reaction
SWNT: Single-walled nanotube
UPD: Underpotential deposition
WE: Working Electrode
RE: Reference Electrode
CE: Counter Electrode

DEFINITIONS

Adatom: An atom located on the surface of an underlying substrate.
Adlayer: A layer of atoms or molecules adsorbed onto the surface of a substrate.
Bilayer: Two consecutive layers of atoms or molecules which occupy available surface sites on each layer and coat substantially the entire exposed surface of the substrate.
Catalysis: A process by which the rate of a chemical reaction is increased by means of a substance (a catalyst) which is not itself consumed by the reaction.
Electrocatalysis: The process of catalyzing a half cell reaction at an electrode surface by means of a substance (an electrocatalyst) which is not itself consumed by the reaction.
Electrodeposition: Another term for electroplating.
Electroplating: The process of using an electrical current to reduce cations of a desired material from solution to coat a conductive substrate with a thin layer of the material.
Monolayer: A single layer of atoms or molecules which occupies available surface sites and covers substantially the entire exposed surface of a substrate.
Multilayer: More than one layer of atoms or molecules on the surface, with each layer being sequentially stacked on top of the preceding layer.
Nanoparticle: Any manufactured structure or particle with at least one nanometer-scale dimension, i.e., 1-100 nm Nanostructure: Any manufactured structure with nanometer-scale dimensions.

Noble metal: A metal that is extremely stable and inert, being resistant to corrosion or oxidation. These generally comprise ruthenium (Ru), rhodium (Rh), palladium (Pd), silver (Ag), rhenium (Re), osmium (Os), iridium (Ir), platinum (Pt), and gold (Au). Noble metals are frequently used as a passivating layer.

Non-noble metal: A transition metal which is not a noble metal.

Redox reaction: A chemical reaction wherein an atom undergoes a change in oxidation number. This typically involves the loss of electrons by one entity accompanied by the gain of electrons by another entity.

Refractory metal: A class of metals with extraordinary resistance to heat and wear, but with generally poor resistance to oxidation and corrosion. These generally comprise tungsten (W), molybdenum (Mo), niobium (Nb), tantalum (Ta), and rhenium (Re).

Slurry: A suspension of solids in a liquid.

Submonolayer: Surface atomic or molecular coverages which are less than a monolayer.

Transition metal: Any element in the d-block of the periodic table which includes groups 3 to 12.

Trilayer: Three consecutive layers of atoms or molecules which occupy available surface sites on each layer and coat substantially the entire exposed surface of the substrate.

Underpotential Deposition: A phenomenon involving the electrodeposition of a species at a potential which is positive with respect to the equilibrium or Nernst potential for the reduction of the metal.

This invention is based on the development of an apparatus and method for the deposition of atomically thin films on a large number of particles in batch or continuous fashion. The apparatus is described as a cell throughout this specification.

In a preferred embodiment, the cell comprises a sonication bath and a chamber submerged in the sonication bath. The chamber has an upper compartment and a lower compartment separated by a microporous material surface. The microporous material is in contact with a working electrode (WE). The upper compartment comprises a reference electrode (RE), and a counter electrode (CE), and a solution of metal ions. The lower compartment comprises an electrochemical cell containing a solution of metal ions. The continuous use of sonication ensures that uncoated particles continually come into contact with the microporous material and facilitates the particles to fall through the microporous material into the lower compartment. By application of the appropriate electrical potential, particles that come into contact with the microporous material, acting as a WE, acquire the charge necessary for an atomic layer of the desired material to deposit by underpotential deposition (UPD). In this embodiment, the desired adlayer is formed on the nanoparticles as the nanoparticles fall through the microporous material and enter into the lower compartment. Accordingly, any nanoparticle that enters the lower compartment is coated with metal ions. This setup facilitates a continuous cell operation and synthesis of electrocatalysts because additional nanoparticles can be continually fed into the upper compartment.

After the particles have been coated with an initial adlayer, the solution containing non-noble metal ions can be separated from the nanoparticles. In an optional step, the $Cu^{2+}$ can be replaced by water or acid solution under inert gas, such as Ar. The nanoparticles coated with non-noble metal ions are then reintroduced into the cell. The noble-metal ions are then slowly added to replace the Cu monolayer in the existing or new suspension by galvanic displacement of the UPD adlayer by the more noble metal.

The apparatus can conceivably be used with any type, size, and shape of particle which can undergo film growth by UPD, as a result of contacting an electrode having an applied potential. Regardless of the type of particle used as the substrate, the apparatus is suitable for commercial manufacturing processes since it facilitates the controlled deposition of ultrathin films with atomic-level control on a large number of these particles in batch or continuous fashion.

I. Particle Synthesis

Particles of carbon, a suitable metal, metal alloy, core-shell, carbon, carbon-nanotube, or carbon-nanohorn are initially prepared using any technique which is well-known in the art. It is to be understood, however, that the invention is not limited to deposition onto metal or carbon-based particles and may include other materials which are well-known in the art including semiconductors and oxides. It is these particles onto which a thin film of the desired material will be deposited. The particles are preferably nanoparticles with sizes ranging from 2 to 100 nm in one or more dimensions. However, the size is not so limited and may extend into the micrometer and millimeter size range.

In one embodiment, the nanoparticles comprise a metal, metal alloy, and/or core-shell particles. It is also to be understood that the metal, metal alloy, and/or core-shell particles may take on any shape, size, and structure as is well-known in the art including, but not limited to, branching, conical, pyramidal, cubical, mesh, fiber, cuboctahedral, and tubular nanoparticles. The nanoparticles may be agglomerated or dispersed, formed into ordered arrays, fabricated into an interconnected mesh structure, either formed on a supporting medium or suspended in a solution, and may have even or uneven size distributions. The particle shape and size is preferably such that the bonding configuration of surface atoms is such that their reactivity and, hence, their ability to function as a catalyst is increased.

In another embodiment the nanoparticles are in the form of nanostructured carbon substrates. Examples of carbon nanostructures include, but are not limited to carbon nanoparticles, nanofibers, nanotubes, fullerenes, nanocones, and/or nanohorns. Within this specification, the primary carbon nanostructures discussed are carbon nanotubes and nanohorns. However, it is to be understood that the carbon nanostructures used are not limited to these particular structures. Carbon nanotubes are identified as nanometer-scale cylindrical structures of indeterminate length comprised of $sp^2$-bonded carbon atoms. The nanotube may be a single-walled nanotube (SWNT) or a multi-walled nanotube (MWNT). A higher specific surface area may be obtained using carbon nanohorns which have a structure analogous to nanotubes, but with one end of the cylindrical tube closed and the other open, resulting in a horn-like shape. Carbon nanohorns generally possess a higher specific surface area than carbon nanotubes and an average pore size (on the order of tens of nm) which is larger than both carbon nanotubes and activated carbon or carbon fibers.

This specification discloses film growth on Pd nanoparticles as an embodiment which exemplifies the spirit and scope of the present invention. It is to be understood, however, that any suitable particle as described above may be used with the apparatus. Methods for producing the various types of nanoparticles and depositing ultrathin surface layers by UPD and galvanic displacement have been previously described in U.S. Patent Appl. Publication No. 2010/0216632 to Adzic et al., which is incorporated by reference in its entirety as if fully set forth in this specification. Production of carbon nanostructures and depositing ultrathin surface layers by UPD and galvanic displacement has previously been described in U.S. Patent Appl. Publication No. 2010/0177462 to Adzic et al., which is incorporated by reference in its entirety as if fully set forth in this specification.

II. Ultrathin Film Growth

Figure 1:
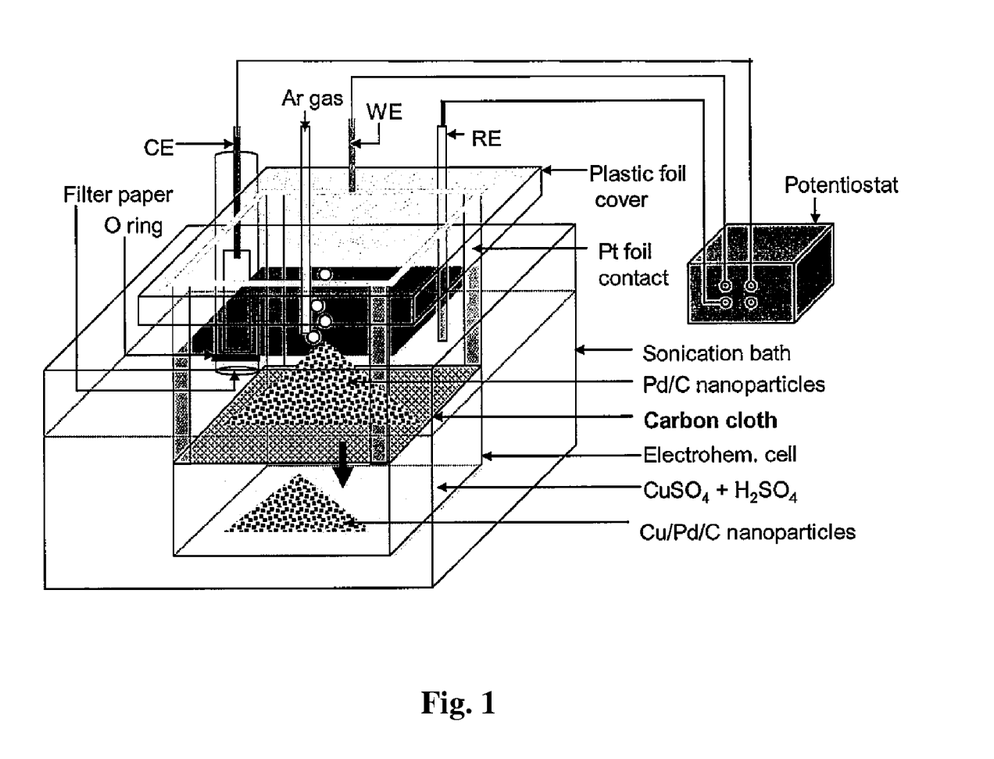
FIG. 1 depicts the components of a cell for synthesis of electrocatalysts.

Once nanoparticles having the desired shape, composition, and size distribution have been fabricated, these particles are added to a cell so that the desired ultrathin films may then be deposited. Film growth is accomplished by UPD using a cell, an embodiment of which is illustrated in FIG. 1. The cell permits the controllable deposition of ultrathin films having thicknesses in the submonolayer-to-multilayer thickness range onto a large number of particles in batch or continuous fashion.

For purposes of this specification, a monolayer is formed when the substrate surface is substantially fully covered by a single layer comprising adatoms which form a chemical or physical bond with the atoms of the underlying substrate. If the surface is not substantially completely covered, e.g., substantially fewer than all available surface sites are occupied by an adatom, then the surface coverage is termed submonolayer. However, if additional layers are deposited onto the first layer, then multilayer coverages result. If two successive layers are formed, then it is termed a bilayer and if three successive layers are formed, then the resultant film is a inlayer and so on. The materials chemistry underlying the present invention may be best understood through an initial description of the cell. This is followed by a description of the principles governing growth by underpotential deposition.

A. Cell

In a preferred embodiment, the cell comprises a chamber that has an upper compartment and a lower compartment separated by a microporous material surface. In this preferred embodiment, the cell is placed in a sonication bath. In a more preferred embodiment, the cell comprises a sonication bath and an chamber submerged in the sonication bath. The chamber has an upper compartment and a lower compartment separated by a microporous material surface. The upper compartment comprises a cover, which contains a working electrode (WE) electrically connected to a Pt foil contact, and the Pt foil contact is electrically connected to the microporous material. The upper chamber further comprises a solution of metal ions, a reference electrode (RE), and a counter electrode (CE). The lower compartment comprises an electrochemical cell containing a solution of metal ions. The cell can be adapted to maintain an atmosphere of an inert gas within the cell. An electric potential applied to the WE can be controlled by an external power supply. In a preferred embodiment the power supply is capable of applying a voltage in the range of −1 to +1 Volts.

In a preferred embodiment, the microporous material is made of a carbon cloth, a reticulated glassy carbon, a microporous carbon material, or a Ti/Ru oxide fine gauze. The pore size of the microporous material can be any size that is appropriate to allow nanoparticles to pass through. Preferably, the microporous material has a pore size between about 30 nm-200 nm. As noted above, the microporous material is in contact with the WE through a Pt foil contact. When nanoparticles contact the microporous material, the nanoparticles obtain an electronic potential of the UPD of Cu. The use of sonication ensures that uncoated particles continually come into contact with the microporous material and facilitates the particles to fall through the microporous material into the lower compartment. By application of the appropriate electrical potential, particles that come into contact with the microporous material, acting as a WE, acquire the charge necessary for an atomic layer of the desired material to deposit by underpotential deposition (UPD). In this embodiment, the desired adlayer is formed on the nanoparticles as the nanoparticles fall through the microporous material and enter into the lower compartment. Accordingly, any nanoparticle that enters the lower compartment is coated with metal ions.

The cell can also contain a CE compartment including a container, filter paper, and/or an o-ring, but can be constructed of any material which is electrically insulating and is capable of holding solutions of a corrosive nature.

The WE, RE, and CE can be covered with an electrically conductive material. Some examples of electrically conductive materials include titanium (Ti) activated by a ruthenium (Ru) coating, stainless steel, and glassy carbon. In a preferred embodiment, the RE is an Ag/AgCl, Cl⁻, or saturated calomel electrode. In a preferred embodiment, the CE is Pt foil.

The cell is also provided with an external power supply (potentiostat) that is capable of applying the desired electrical potential to the electrodes. The cell also comprises a sonication bath. In one embodiment, the sonication bath is a FISHER SCIENTIFIC Ultrasonic Cleaners Model FS110, 2½ gal., 120 V 50/60 Hz, 2A, 185 W.

The reaction of interest occurs when the nanoparticles contact the microporous material that is electrically connected to the WE. The half-cell reactivity of the nanoparticles can be measured by varying the potential applied to the WE and then measuring the resulting current flow. The CE serves as the other half of the half-cell and balances the electrons which are added or removed at the WE. In order to determine the potential of the WE, the potential of the CE must be known. Completion of the redox reactions occurring at the exposed surfaces of the WE requires that a constant potential be maintained at both electrodes while the necessary current is permitted to flow. In practice this is difficult to accomplish using a two-electrode system. This issue may be solved by introducing the RE to divide the role of supplying electrons and maintaining a reference potential between two separate electrodes. The RE is a half cell with a known reduction potential. It acts as a reference in the measurement and control of the potential of the WE. The RE does not pass any current to or from the electrolyte; all current needed to balance the reactions occurring at the WE flows through the CE.

The sole purpose of the CE is to permit the flow of electrical current from the solution. Consequently the CE can be nearly any material as long as it is a good conductor and does not react with the electrolyte. Most CEs are fabricated from Pt wire since Pt is a good electrical conductor and is electrochemically inert. The wire may be of any thickness, but it is typically thin. The RE has a stable and well-known electrode potential which is usually attained by means of a redox system having constant concentrations of each participant in the redox reaction. Examples include a normal hydrogen electrode (NHE) or a silver-silver chloride (Ag/AgCl) reference electrode. The RE provides a reference potential.

In a typical setup, the WE, RE, and CE of the cell are static and the desired nanoparticles are sonicated in the upper compartment of the chamber. This sonication provides a flux of particles on the microporous material that is connected to the WE. The sonication, therefore, facilitates collisions between particles and the WE where the particles come into electrical contact and are given the charge necessary to facilitate film growth. The sonication setting is chosen such that the flux of incoming and outgoing particles is balanced and the probability of electrical contact between the microporous material and the particles is maximized. Preferred sonication setting is the "low setting" using the FISHER SCIENTIFIC Ultrasonic Cleaners Model FS110. The electrochemical reactions occurring through the exposed surface of the WE can be controlled and analyzed by varying the electrode potential with time and measuring the resulting current flow. The potential is measured between the RE and the WE whereas the current is measured between the WE and the CE.

The sonication and electrical contact time of the process depends on a number of factors including the amount of nanoparticles present and the amount of the ions in the solution. In a preferred embodiment, the process time for preparing an adlayer of non-noble metal ions is between 10 min to about 2 hours. In a preferred embodiment, the process time is about 10 minutes. The most preferred time can be identified as the time when all the particles have fallen in the lower compartment. The process time during the galvanic displacement reaction can be significantly shorter. This time also depends on the amount of the nanoparticles and ions present in the solution and the time that it takes for the nanoparticles to pass through the microporous material. In a preferred embodiment, the process time for the galvanic displacement is about 10 minutes. The most preferred time can be identified as the time when all the particles have fallen in the lower compartment.

The applied potential can be changed linearly with time such that oxidation or reduction of species at the electrode surface can be analyzed through changes in the current signal as is typically performed during linear voltammetry measurements. Although the applied potential preferably ranges from −1 to +1 volts, the exact potential range used depends on the specifics of a particular configuration, including parameters such as the type of particles and UPD element. As an example, for the UPD of Cu, the applied potential typically ranges from 0.05 to 0.5 V versus a silver/silver chloride (Ag/AgCl, Cl$^-$) RE. Oxidation is registered as an increase in current whereas reduction results in a decrease in the current signal. The resultant peaks and troughs can be analyzed and information on the kinetics and thermodynamics of the system can be extracted. If the nanoparticles is redox active it may display a reversible wave in which the nanoparticles are reduced (or oxidized) during a linear sweep in the forward direction and is, oxidized (or reduced) in a predictable manner when the potential is stopped and then swept in the reverse direction such as during cyclic voltammetry.

In conventional electrodeposition a cation contained in solution is reduced by the flow of electrical current through a conductive substrate. At the substrate surface, electrons combine with and thereby reduce cations in solution to form a thin film on the surface of the substrate itself. In order for the overall reaction to proceed, the reduction of cations at one electrode must be counterbalanced by oxidation at a second electrode. In a standard electroplating setup the part to be plated is the cathode whereas oxidation occurs at the anode. The cathode is connected to the negative terminal of an external power supply whereas the anode is connected to the positive terminal. When the power supply is activated, the material constituting the anode is oxidized to form cations with a positive charge whereas cations in solution are reduced and thereby plated onto the surface of the cathode. The cathode and anode in an electroplating cell are analogous to the WE and CE, respectively, in the three-terminal cell of FIG. 1.

For conventional metals there is generally a bulk deposition potential (or Nernst potential) which is necessary for deposition of the metal itself to proceed. It is known that for certain metals it is possible to deposit a single monolayer or bilayer of the metal onto a substrate of a different metal at potentials positive to the bulk deposition potential. In this case, formation of the metal monolayer occurs before bulk deposition can proceed. This phenomenon is known as underpotential deposition (UPD) and it occurs when the adatom-substrate bonding is stronger than the adatom-adatom bonding. An example is provided by Brankovic, et al. which discloses the use of UPD to form an adlayer of Cu onto Pd substrates in "*Metal Monolayer Deposition by Replacement of Metal Adlayers on Electrode Surfaces*," Surf. Sci., 474, L173 (2001) which is incorporated by reference in its entirety as if fully set forth in this specification. The process used to form adlayers by UPD is generally reversible. By sweeping the applied potential in one direction, a monolayer of the desired material may be deposited whereas a sweep in the reverse direction results in desorption of the thus-formed monolayer.

When contact is made between the microporous material, acting as a WE, and the nanoparticles, charge is transferred from the microporous material to the particle such that metal ions in solution are reduced and deposited onto the surface of the particles by UPD. The sonication action agitates the nanoparticles such that uncoated particles continuously come into contact with and pass through the microporous material in contact with the WE. The sonication facilitates the passage of the nanoparticles through the microporous material. In this manner, a thin film can be deposited onto substantially all of the particles as they contact and pass through the microporous material into the lower chamber. Accordingly, any nanoparticle that enters the lower compartment is coated with metal ions. The overall size of the cell determines the quantity of particles that can be processed in a single batch of 200 ml to 2000 ml. A typical configuration is capable of processing 1 to 50 grams of particles in a single batch. In another embodiment, it is conceivable that the nanoparticles could be continuously fed into and out of the cell where particles come into contact with the microporous material in contact with the WE so that an ultrathin film can be deposited.

B. Underpotential Deposition and Galvanic Displacement

Having described the structure, function, and operation of the cell, processes by which the cell may be used to deposit ultrathin films will now be described in detail. The deposition process is centered around a series of electrochemical reactions which, when performed sequentially result in an ultrathin film with the targeted surface coverage. In one embodiment, the procedure involves the initial formation of an adlayer of a material onto the surface of the particles by UPD. This is followed by the galvanic displacement of the adlayer by a more noble metal, resulting in the conformal deposition of a layer of the more noble metal on the substrate. It is to be understood, however, that although the cell is particularly advantageous for use during UPD growth, it is not limited to this particular growth technique and may be used for other electrochemical processes such as electroplating.

Example 1

Figure 2:
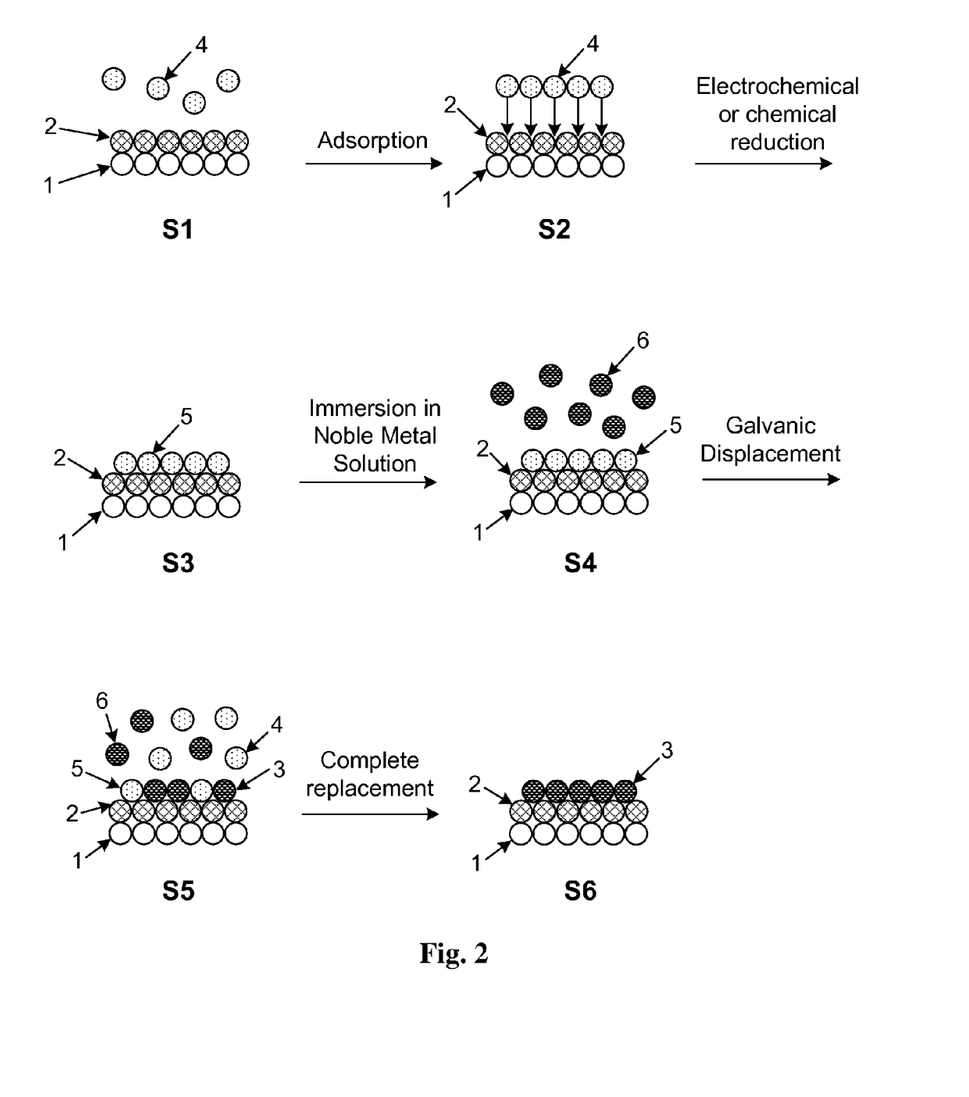
FIG. 2 shows a series of images illustrating the underpotential deposition of an adlayer onto the surface of a core-shell nanoparticle followed by galvanic displacement by a more noble metal.

The present invention may be illustrated by way of exemplary embodiments. In this example, the deposition process will be described with reference to deposition onto non-noble metal-noble metal core-shell nanoparticles. The core-shell nanoparticles may be initially formed using any method known in the art including, for example, those disclosed in U.S. Patent Appl. Pub. No. 2010/021.6632. The deposition process in Example 1 will now be described using FIGS. 2 and 3 as a reference. The nanoparticle surface in FIG. 2 shows a portion of the non-noble metal core (1) along with the noble metal shell (2). Non-noble metal ions (4) are initially adsorbed on the surface by immersing the nanoparticles in a cell comprising the appropriate concentration of non-noble metal ions (4) in step S1. The non-noble metal (4) ions are contained in solution in the electrochemical cell in FIG. 1. Typical non-noble metal ions that may be used for UPD of an initial adlayer include, but are not limited to, copper (Cu), lead (Pb), bismuth (Bi), tin (Sn), cadmium (Cd), silver (Ag), antimony (Sb), and thallium (Tl). In this example, the preferred non-noble metal ion solution is 50 mM $CuSO_4$ in a 50 mM $H_2SO_4$ solution.

By the process of applying sonication and the appropriate potential (−1 to +1 V), film growth by UPD occurs whenever a core-shell particle contacts the exposed surface of the carbon cloth microporous material that is in contact with the WE and acquires the charge necessary for UPD. This leads to the adsorption of metal ions (4) on the nanoparticle surface in step S2 and the formation of a monolayer of the non-noble metal (5) in step S3. This monolayer forms a substantially continuous "skin" around the periphery of the core-shell nanoparticle. It is to be understood, however, that whether the initial UPD adlayer achieves submonolayer or monolayer surface coverages depends on the duration of the contact between the particle and the microporous material in contact with the WE as well as the applied potential. The duration of the contact is influenced by a number of factors including the sonication setting, the shape and size of the nanoparticles, the viscosity of the nanoparticles, and whether deposition proceeds in batch or continuous fashion. Although the reaction itself is fast, these other factors generally require that the process continue for about 10 to 20 minutes and up to about 2 hours, or until all of the nanoparticles pass through the microporous material.

After formation of an initial non-noble metal adlayer by UPD is complete, the non-noble metal ions remaining in solution can be separated from the nanoparticles and replaced by water or acid solution under inert gas. Alternatively, the noble-metal ions can be slowly added to replace the non-noble metal ions in the existing suspension or new solution. Replacing the non-noble metal ions with noble-metal ions helps to remove excess non-noble metal ions (4) present on the surfaces of the particles. The particles are typically maintained under a argon or other inert atmosphere during transfer to inhibit oxidation of the freshly deposited non-noble metal adlayer (5). A solution comprising a salt of a more noble metal is added in step S4 where the more noble metal ions (6) contained in solution replace surface non-noble metal adatoms (5) via a redox reaction as illustrated in step S5. The more noble metal (6) acts as an oxidizing agent by accepting electrons from the non-noble metal. The simultaneous reduction of the more noble metal ions (6) to an adlayer of the more noble metal (3) results in the replacement of surface non-noble metal atoms (5) with the more noble metal atoms (3). For example, monolayers of a noble metal such as palladium, platinum, gold, iridium, ruthenium, osmium, or rhenium can be deposited by displacement of a less noble metal using salts of $PdCl_2$, $K_2PtCl_4$, $AuCl_3$, $IrCl_3$, $RuCl_3$, $OsCl_3$, or $ReCl_3$, respectively. The galvanic displacement process may be performed separately, within the same or a different cell. When performed in the cell, agitation of the solution can be facilitated by sonicating the nanoparticles at a predetermined setting. In this example, the preferred noble metal ion solution is 1.0 mM $K_2PtCl_4$ in a 50 mM $H_2SO_4$ solution.

Figure 3:
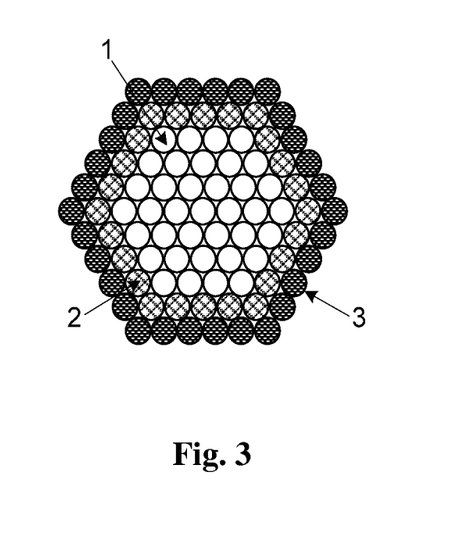
FIG. 3 is an atomic-scale cross-sectional schematic of a core-shell nanoparticle encapsulated by a monolayer of a catalytically active metal.

The final product is a core-shell nanoparticle with a "skin" comprising a monolayer of the more noble metal atoms as shown in step S6 and illustrated in FIG. 3. The encapsulated core-shell nanoparticle cross-section in FIG. 3 shows that all atoms are close-packed in a hexagonal lattice, resulting in a hexagonal shape. It is to be understood, however, that the crystallographic structure is not limited to that shown and described in FIG. 3. The cycle depicted in FIG. 2 may be repeated any number of times to deposit additional layers of the more noble metal (3) onto the surface of the core-shell nanoparticle to ensure complete coverage. Conversely, less than a monolayer of the non-noble metal (5) may be deposited during UPD such that submonolayer coverages of the noble metal (3) result. While only a portion of the surface of a single core-shell nanoparticle is illustrated in FIG. 2, it is to be understood that deposition occurs simultaneously on a large number of core-shell nanoparticles. The "skin" of atoms forms a continuous and conformal coverage of the entire available surface area of each nanoparticle.

Figure 4:
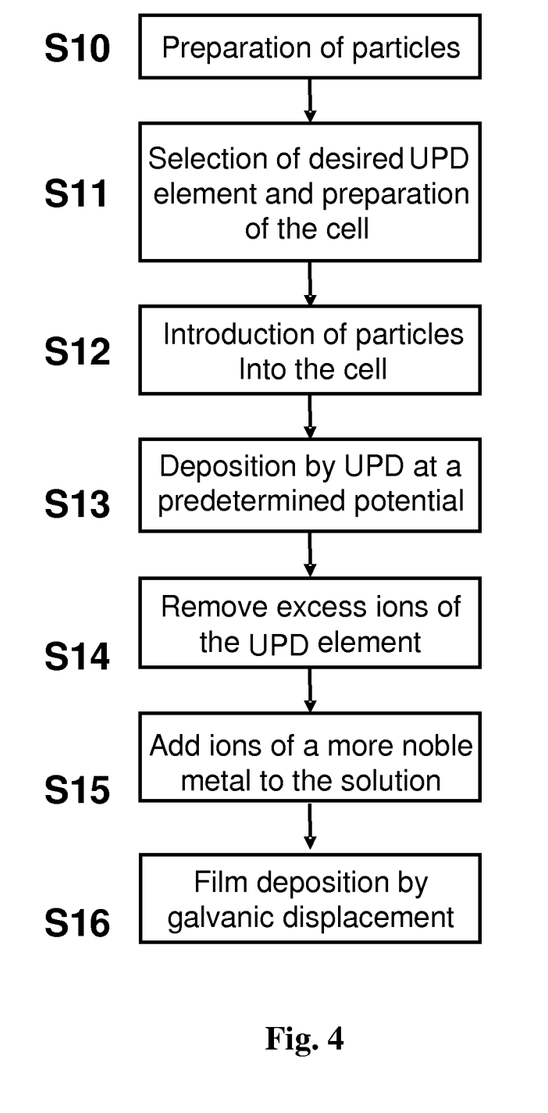
FIG. 4 is a flowchart showing the sequence of steps performed during film growth using the cell.

A generic description of UPD and galvanic displacement growth of ultrathin films using the cell will now be given in detail with reference to FIG. 4. The process flow illustrated in FIG. 4 is intended to describe a specific way of practicing the invention. However, it is to be understood that there are many possible variations which do not deviate from the spirit and scope of the present invention.

Example 2

A second exemplary embodiment of the present invention will now be described in detail with reference to FIG. 4 which shows the overall process flow for film growth by UPD and galvanic displacement using a cell. Initially, in step S10, particles of the desired composition, size, and shape are formed. Such particles may also be purchased from commercial vendors, such as E-TEK (39 Veronica Av., Somerset, N.J., 08873) and BASF (Germany). The particles used may be of any type onto which atomic layers of the desired material may be deposited. In a preferred embodiment the particles are of the type described in Section I above. Prior to deposition of an initial adlayer by UPD, it is necessary to prepare the cell to contain the ions of the desired UPD element as shown in step S11. The UPD element must be a material which exhibits underpotential deposition such as, for example, any of Cu, Pb, Bi, Sn, Ce, Ag, Sb, and Tl.

In step S12 the particles are introduced into the cell. This may be accomplished, for example, by physically placing the particles into the cell as in a batch process or by initiating flow of the particles as in a continuous process. Deposition by UPD proceeds by applying sonication (using the "low setting" of a FISHER SCIENTIFIC Ultrasonic Cleaners Model FS110 sonicator) and the appropriate electrode potential (−1 to +1 V) in step S13. The continuous use of sonication ensures that uncoated particles continually come into contact with the microporous material and facilitates the particles to fall through the microporous material into the lower compartment. By application of the appropriate electrical potential, particles that come into contact with the microporous material, acting as a WE, acquire the charge necessary for an atomic layer of the desired material to deposit by underpotential deposition (UPD). In this embodiment, the desired adlayer is formed on the nanoparticles as the nanoparticles fall through the microporous material and enter into the lower compartment. Accordingly, any nanoparticle that enters the lower compartment is coated with metal ions. If the process is continuous, particles are continuously fed into the cell where the desired fraction of particles are coated with an adlayer of the UPD element.

In step S14, the particles are removed from the lower compartment of the chamber and the ions of the UPD element, which are still in solution, are removed such that ions of a more noble metal can be added in step S15. As noted above, the non-noble metal ions remaining in solution can either be separated from the nanoparticles and replaced by water or acid solution under inert gas or, alternatively, the noble-metal ions can be slowly added to replace the non-noble metal ions in the existing suspension or new solution.

In step S16, the particles coated with the non-noble metal are introduced into the upper compartment of the chamber where the adsorbed atoms of the UPD element are replaced with atoms of the more noble metal by galvanic displacement to produce an ultrathin film of the noble metal. The continuous use of sonication ensures that coated particles continually come into contact with the microporous material and facilitates the particles to fall through the microporous material into the lower compartment. By application of the appropriate electrical potential, particles that come into contact with the microporous material, acting as a WE, the adsorbed atoms of the UPD element are replaced with atoms of the more noble metal by galvanic displacement. In this embodiment, the desired adlayer is formed on the nanoparticles as the nanoparticles fall through the microporous material and enter into the lower compartment. Accordingly, any nanoparticle that enters the lower compartment is coated with the noble-metal ions. The particles can then be removed from the cell, rinsed, and dried. Steps S11 through S16 can be repeated as desired to deposit additional layers onto the plurality of particles.

It is envisioned that a plurality of cells may be used to deposit ultrathin films onto a large number of particles in a manner suitable for operation on a commercial scale. When in batch form, there may be a plurality of separate stations for preparing particles, depositing an initial adlayer by UPD, rinsing the particles, forming an ultrathin film by galvanic displacement, and then rinsing and drying the particles. Alternatively, a continuously operating line with a plurality of cells may be envisioned. During operation, each of the steps provide in FIG. 4 may be performed at a different station.

In a preferred application, particles coated using the process described in this specification may be used as the cathode in a fuel cell. This application is, however, merely exemplary and is being used to describe a possible implementation of the present invention. Implementation as a fuel cell cathode is described, for example, in U.S. Patent Appl. Pub. No. 2010/0216632 to Adzic, et al. It is to be understood that there are many possible applications which may include, but are not limited to hydrogen sensors, charge storage devices, applications which involve corrosive processes, as well as various other types of electrochemical or catalytic devices.

It will be appreciated by persons skilled in the art that the present invention is not limited to what has been particularly shown and described hereinabove. Rather, the scope of the present invention is defined by the claims which follow. It should further be understood that the above description is only representative of illustrative examples of embodiments. For the reader's convenience, the above description has focused on a representative sample of possible embodiments, a sample that teaches the principles of the present invention. Other embodiments may result from a different combination of portions of different embodiments.

The description has not attempted to exhaustively enumerate all possible variations. That alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent. Furthermore, all references, publications, U.S. patents, and U.S. patent application Publications cited throughout this specification are hereby incorporated by reference as if fully set forth in this specification.

The invention claimed is:

1. An apparatus for depositing ultrathin films on a plurality of microparticles or nanoparticles comprising:
    a two-compartment chamber configured for submersion in a sonication bath,
    the two-compartment chamber comprising an upper compartment and a lower compartment separated by a microporous material, and
    the upper compartment comprising a cover, a working electrode, a Pt foil contact, a reference electrode and a counter electrode, wherein the working electrode is electrically connected to the Pt foil contact, and the Pt foil contact is electrically connected to the microporous material,
    wherein the microporous material acts as a working electrode, and
    wherein the microporous material working electrode serves to deposit the film on the microparticles or nanoparticles as the microparticles or nanoparticles pass from the upper compartment to the lower compartment.

2. The apparatus of claim 1 further comprising a power supply configured to supply an applied potential to the working electrode.

3. The apparatus of claim 2 wherein the power supply is operable to supply a voltage in a range of −1 to +1 Volts.

4. The apparatus of claim 1 wherein the microporous material is selected from the group consisting of a carbon cloth, a reticulated glassy carbon, a microporous carbon material, and a Ti/Ru oxide fine gauze.

5. The apparatus of claim 1 wherein the cell is adapted to maintain an atmosphere of inert gas.

6. The apparatus of claim 1, wherein the lower compartment comprises an electrochemical cell for containing a solution of metal ions.

7. A method for depositing ultrathin films on a plurality of nanoparticles comprising:
    (a) preparing an apparatus according to claim 1 with an electrolyte having a predetermined concentration of ions of a non-noble metal to be deposited as an adlayer;
    (b) introducing the plurality of nanoparticles into the cell;
    (c) applying sonication to the cell;
    (d) applying a predetermined potential to the microporous material electrically connected to the working electrode for a predetermined duration, whereby a non-noble metal adlayer is deposited onto the nanoparticles as they contact and fall through the microporous material;
    (e) removing the nanoparticles having a non-noble metal adlayer from the lower compartment of the chamber;
    (f) replacing the excess non-noble metal ions from the cell with an electrolyte having a predetermined concentration of ions of a more noble metal;
    (g) reintroducing the nanoparticles having a non-noble metal adlayer from step (e) into the upper compartment of the chamber;
    (h) applying sonication to the cell; and
    (i) applying a predetermined potential to the microporous material electrically connected to the working electrode for a predetermined duration to deposit the more noble metal ions on the coated nanoparticles by galvanic displacement as the coated nanoparticles contact and pass through the microporous material, whereby the process of galvanic displacement results in nanoparticles coated with an adlayer of the more noble metal.

8. The method of claim 7 wherein the nanoparticles are Pd nanoparticles.

9. The method of claim 7 wherein the first and second applied potentials are between −1 and +1 Volts.

10. The method of claim 7 wherein the predetermined duration is between 10 minutes to 2 hours.

11. The method of claim 7 wherein an adlayer of up to one monolayer is deposited on the surface of the microparticles or nanoparticles.

12. The method of claim 7 where in the sonication in both (c) and (h) are performed on a low setting for 10 minutes.

13. The method of claim 7 wherein the non-noble metal ions are selected from the group consisting of Cu, Pb, Bi, Sn, Ce, Ag, Sb, and Tl.

14. The method of claim 7 wherein the electrolyte of (a) is 50 mM $CuSO_4$ in a 50 mM $H_2SO_4$ solution.

15. The method of claim 7 wherein ions of a more noble metal are produced by adding a salt of one or more of $PdCl_2$, $K_2PtCl_4$, $AuCl_3$, $IrCl_3$, $RuCl_3$, $OsCl_3$, or $ReCl_3$, and whereby addition of the salt results in galvanic displacement of the material deposited as an adlayer by the more noble metal contained within the salt.

16. The method of claim 7 wherein the electrolyte of (e) is 1.0 mM $K_2PtCl_4$ in a 50 mM $H_2SO_4$ solution.

17. The method of claim 7 wherein the nanoparticles are processed as a batch.

18. The method of claim 7 wherein the nanoparticles are continuously fed to the apparatus for depositing ultrathin films using a predetermined flow rate.

* * * * *

UNITED STATES PATENT AND TRADEMARK OFFICE
CERTIFICATE OF CORRECTION

PATENT NO. : 9,017,530 B2
APPLICATION NO. : 13/427309
DATED : April 28, 2015
INVENTOR(S) : Radoslav Adzic, Junliang Zhang and Kotaro Sasaki It is certified that error appears in the above-identified patent and that said Letters Patent is hereby corrected as shown below:

Title Page, item (54) and in the Specification, Column 1, lines 1-6 Change the Title:

From – Method and Electrochemical Cell For Synthesis and Treatment of Metal Monolayer Electrocatalysts Metal, Carbon, and Oxide Nanoparticles Ion Batch, or In Continuous Fashion To – Method and Electrochemical Cell For Synthesis and Treatment of Metal Monolayer Electrocatalysts Metal, Carbon, and Oxide Nanoparticles In Batch, or In Continuous Fashion Signed and Sealed this
Third Day of November, 2015

Michelle K. Lee
*Director of the United States Patent and Trademark Office*